(12) United States Patent
Tanaka

(10) Patent No.: US 9,091,906 B2
(45) Date of Patent: Jul. 28, 2015

(54) PROJECTOR, IMAGE PROJECTING SYSTEM, AND IMAGE PROJECTING METHOD

(71) Applicant: Seiko Epson Corporation, Tokyo (JP)

(72) Inventor: Hiroyuki Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/631,557

(22) Filed: Feb. 25, 2015

(65) Prior Publication Data

US 2015/0172555 A1 Jun. 18, 2015

Related U.S. Application Data

(63) Continuation of application No. 14/189,735, filed on Feb. 25, 2014, which is a continuation of application No. 12/831,801, filed on Jul. 7, 2010, now Pat. No. 8,696,140.

(30) Foreign Application Priority Data

Jul. 9, 2009 (JP) .................................. 2009-162463

(51) Int. Cl.
*G03B 21/14* (2006.01)
*G03B 21/28* (2006.01)
*H04N 9/31* (2006.01)

(52) U.S. Cl.
CPC .............. *G03B 21/147* (2013.01); *G03B 21/28* (2013.01); *H04N 9/3185* (2013.01); *H04N 9/3194* (2013.01); *G03B 21/14* (2013.01)

(58) Field of Classification Search
CPC ...... G03B 21/14; G03B 21/147; G03B 21/28; H04N 9/31; H04N 9/3185; H04N 9/3194
See application file for complete search history.

(56) References Cited

U.S. PATENT DOCUMENTS 5,371,543 A 12/1994 Anderson
6,226,460 B1 5/2001 Hino et al.
(Continued)

FOREIGN PATENT DOCUMENTS

CN 101951486 A 1/2011
JP 2001-236178 A 8/2001
(Continued)

OTHER PUBLICATIONS

Non-Final Office Action received in U.S. Appl. No. 12/831,801; Nov. 6, 2012.
(Continued)

*Primary Examiner* — Jori S Reilly-Diakun
(74) *Attorney, Agent, or Firm* — ALG Intellectual Property, LLC

(57) ABSTRACT

A projector may include an imaging unit, a positional-information generating unit, and a projecting unit. The imaging unit picks up an image of a projection target area with light in a first wavelength band and generates a first pickup image and picks up an image of the projection target area with light in a second wavelength band and generates a second pickup image. The positional-information generating unit generates, on a basis of the first pickup image, adjustment data for performing adjustment of positional information indicating a position of indication light and generates, on a basis of the second pickup image, the positional information. The projecting unit projects an image based on the positional information.

13 Claims, 11 Drawing Sheets

(56) References Cited

U.S. PATENT DOCUMENTS

| | | |
|---|---|---|
| 6,802,611 B2 | 10/2004 | Chu et al. |
| 6,924,816 B2 | 8/2005 | Deering |
| 7,176,881 B2 | 2/2007 | Nishimura et al. |
| 7,270,422 B2 | 9/2007 | Matsuda et al. |
| 7,306,341 B2 | 12/2007 | Chang |
| 7,559,656 B2 | 7/2009 | Yumiki et al. |
| 7,762,672 B2 | 7/2010 | Yokoyama et al. |
| 8,449,122 B2 * | 5/2013 | Luo ................. 353/70 |
| 8,696,140 B2 | 4/2014 | Tanaka |
| 2001/0022861 A1 | 9/2001 | Hiramatsu |
| 2003/0178555 A1 | 9/2003 | Fang |
| 2005/0270494 A1 | 12/2005 | Banning |
| 2011/0007283 A1 | 1/2011 | Tanaka |
| 2011/0012925 A1 | 1/2011 | Luo |
| 2014/0176917 A1 | 6/2014 | Tanaka |

FOREIGN PATENT DOCUMENTS

| | | |
|---|---|---|
| JP | 2003-276399 A | 9/2003 |
| JP | 2003-348385 A | 12/2003 |
| JP | 2005-092592 A | 4/2005 |
| JP | 2005-094599 A | 4/2005 |
| JP | 2005-148451 A | 6/2005 |
| JP | 2005-286575 A | 10/2005 |
| JP | 2006-053313 A | 2/2006 |
| JP | 2008-109337 A | 5/2008 |
| JP | 2011-002650 A | 1/2011 |
| JP | 2011-097264 A | 5/2011 |

OTHER PUBLICATIONS

Non-Final Office Action received in U.S. Appl. No. 12/831,801; May 28, 2013.

Notice of Allowance and Notice of Allowability received in U.S. Appl. No. 12/831,801; Nov. 25, 2013.

Notice of Allowance and Notice of Allowability received in U.S. Appl. No. 14/189,735; Aug. 6, 2014.

Notice of Allowance and Notice of Allowability received in U.S. Appl. No. 14/189,735; Nov. 24, 2014.

* cited by examiner

PROJECTOR, IMAGE PROJECTING SYSTEM, AND IMAGE PROJECTING METHOD

CROSS-REFERENCE

The present application is a continuation application of Ser. No. 14/189,735 filed on Feb. 25, 2014, which is a continuation of U.S. patent application Ser. No. 12/831,801 filed on Jul. 7, 2010, which claims priority from Japanese Patent Application No. 2009-162463 filed on Jul. 9, 2009, which are hereby expressly incorporated by reference in their entirety.

BACKGROUND

1. Technical Field

The present invention relates to a projector, an image projecting system, and an image projecting method.

2. Related Art

As disclosed in JP-A-2003-276399, an electronic blackboard system including a PC, an electronic pen, an infrared camera, and a projector is proposed. As disclosed in JP-A-2005-286575, a projector is proposed that performs, for example, correction of keystone distortion of a projected image using imaging means such as a CCD camera on the basis of information obtained by picking up a calibration image.

For example, when these projectors are combined, in the related art, the infrared camera for receiving infrared light (indication light) from the electronic pen and a normal camera for picking up an image for keystone distortion correction needs to be provided in the projectors. This makes the configuration of the projectors complicated and causes an increase in cost. The normal camera as an imaging unit is solely used for collection of information necessary for the keystone distortion correction. An imaging function is not effectively utilized.

SUMMARY

An advantage of some aspects of the invention is to solve the problems described above to thereby provide a projector, an image projecting system, and an image projecting method that can more effectively utilize the imaging function.

According to an aspect of the invention, there is provided a projector including: an imaging unit that picks up an image of a projection target area with light in a first wavelength band and generates a first pickup image and picks up an image of the projection target area with light in a second wavelength band and generates a second pickup image; an image generating unit that performs keystone distortion correction on the basis of the first pickup image; a positional-information generating unit that generates, on the basis of the second pickup image, positional information indicating a position of indication light included in the projection target area; and a projecting unit that projects an image based on the positional information in a state in which the keystone distortion correction is performed.

According to the aspect of the invention, the imaging unit picks up an image for the keystone distortion correction and picks up an image including the indication light respectively at wavelengths in different bands. Therefore, it is possible to provide a projector that can effectively utilize the imaging function.

In the projector according to the aspect of the invention, the imaging unit may include: a first filter in which the transmittance of the light in the first wavelength band is sufficiently lower than the transmittance of the light in the second wavelength band; an imaging sensor; and a filter driving unit that moves, during the generation of the second pickup image, the first filter such that the light in the first wavelength band is not made incident on the imaging sensor. With this configuration, it is possible to obtain accurate positional information on the basis of the second pickup image not including light in a band unnecessary for the generation of the positional information.

In the projector according to the aspect of the invention, the imaging unit may include: a second filter in which the transmittance of the light in the second wavelength band is sufficiently lower than the transmittance of the light in the first wavelength band; an imaging sensor; and a filter driving unit that moves, during the generation of the first pickup image, the second filter such that the light in the second wavelength band is not made incident on the imaging sensor. With this configuration, it is possible to perform accurate keystone distortion correction on the basis of the first pickup image not including light in a band not used for the keystone distortion correction.

The projecting unit may project a position adjustment image for performing position adjustment for the indication light on the projection area, and the imaging unit may pick up an image of the projection area including the indication light in a state in which the position adjustment image is projected. With this configuration, the projector or the like can generate more accurate positional information on the basis of an appropriately formed position adjustment image.

The image generating unit may generate state information indicating a correction state of the keystone distortion correction, and the positional-information generating unit may generate, on the basis of the state information, the positional information corresponding to the correction state. With this configuration, the projector or the like can more accurately project an image corresponding to the position of the indication light by generating positional information corresponding to the correction state of the keystone distortion correction.

The light in the second wavelength band may be light in an infrared region. With this configuration, a device such as an electronic pen that emits infrared light as the indication light can also be used. Therefore, it is possible to perform interactive presentation without preventing visual recognition of a projected image.

The imaging unit may include a guide substantially orthogonal to a direction in which light is made incident on the imaging sensor, and the filter driving unit may drive the first filter to move along the guide. Since a mechanism for switching the image pickup with the light in the first wavelength band and the image pickup with the light in the second wavelength band is simple, it is possible to reduce cost for the imaging unit.

The imaging unit may include a guide substantially orthogonal to a direction in which light is made incident on the imaging sensor, and the filter driving unit may drive the second filter to move along the guide. Since a mechanism for switching the image pickup with the light in the first wavelength band and the image pickup with the light in the second wavelength band is simple, it is possible to reduce cost for the imaging unit.

The projector may include a projection-side interface unit that transmits the positional information to an image supplying apparatus and receives image information indicating an image corresponding to the positional information from the image supplying apparatus. With this configuration, the image supplying apparatus dynamically generates image information according to the positional information received from the projector. The projector projects an image based on the image information dynamically generated by the image supplying apparatus. Therefore, it is possible to perform interactive and dynamic presentation.

According to another aspect of the invention, there is provided an image projecting system including the projector and the image supplying apparatus. The image supplying apparatus includes: a supply-side interface unit that transmits the image information to the projector and receives the positional information from the projector; and an image-information generating unit that generates the image information on the basis of the positional information. Therefore, a presentation system including a device that emits invisible indication light such as an electronic pen can be more inexpensively provided.

The invention can be realized in various forms. The invention can be realized in forms such as an image projecting method and an apparatus that carries out the method, a computer program for realizing functions of the method or the apparatus, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments in which the invention is applied to a projector are explained below with reference to the accompanying drawings. The embodiments explained below do not limit the contents of the invention described in claims. All of components described in the embodiments are not always essential as solving means of the invention described in claims.

First Embodiment

Figure 1A:
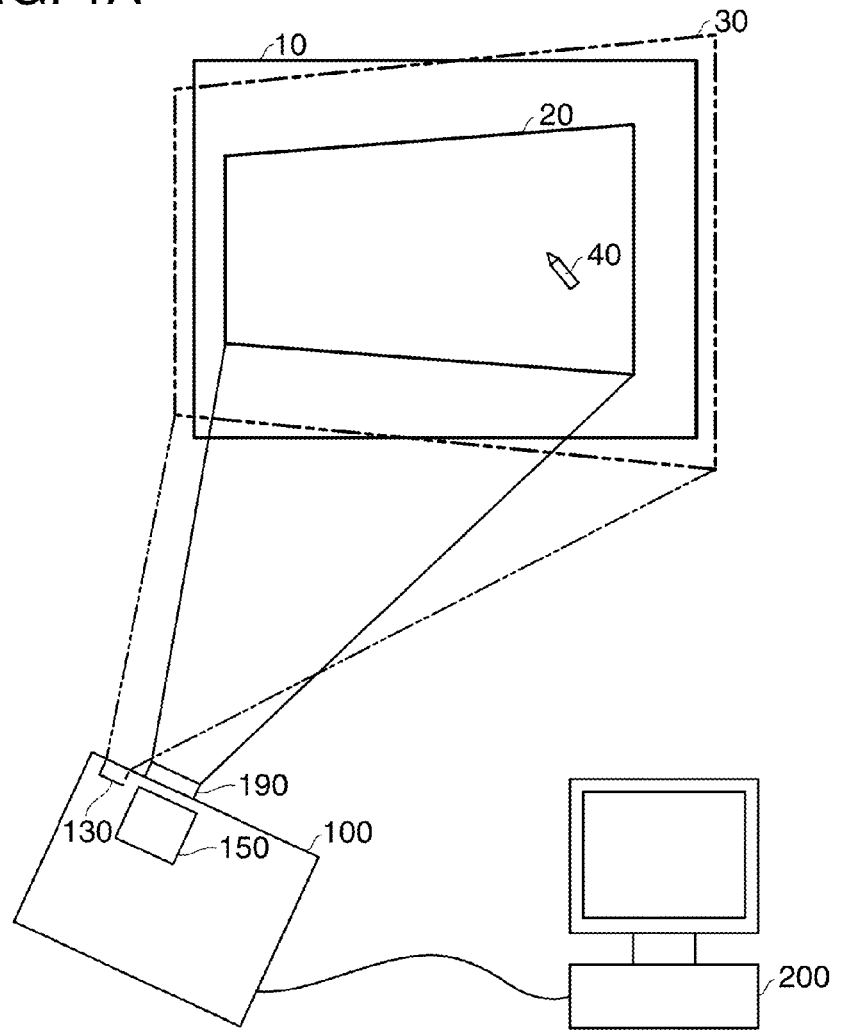
FIG. 1A is a diagram of an image projection state in a first embodiment.
Figure 1B:
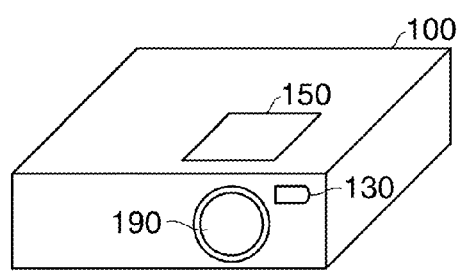
FIG. 1B is a perspective view of a projector in the first embodiment.

FIG. 1A is a diagram of an image projection state in a first embodiment. FIG. 1B is a perspective view of a projector 100 in the first embodiment. The projector 100 has a function of projecting an image 20 on a screen 10 having a projection target area and picking up, using an imaging unit 130, an image of an imaging range 30 including the image 20 projected on the screen 10.

The projector 100 is connected to a PC 200, which is a kind of an image supplying apparatus, via a USB cable or the like. The projector 100 receives image information from the PC 200 and transmits positional information indicating the position of indication light (in this embodiment, infrared light) emitted by an electronic pen 40 to the PC 200. The PC 200 generates image information corresponding to the positional information and transmits the image information to the projector 100. The projector 100 projects an image based on the image information. In other words, the projector 100 and the PC 200 function as an interactive projecting system that projects an image corresponding to indication by the electronic pen 40.

Figure 2:
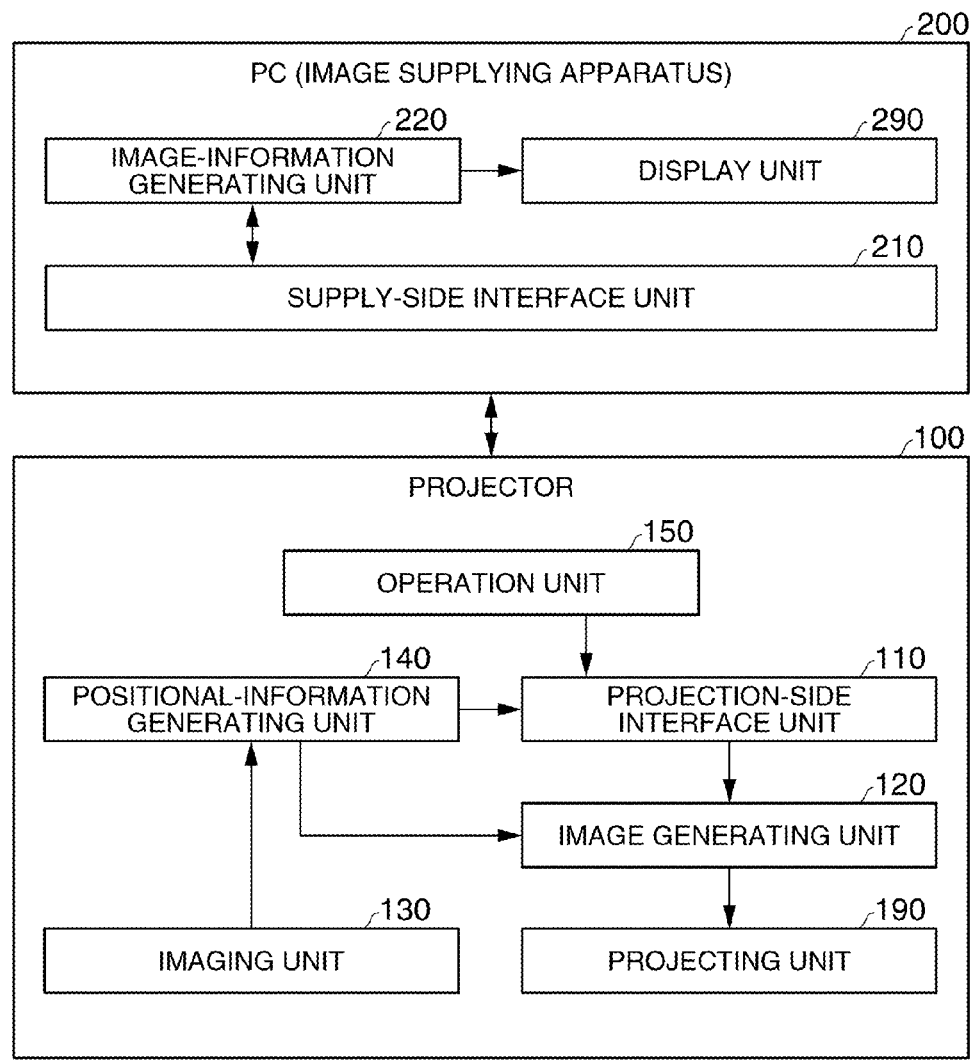
FIG. 2 is a functional block diagram of the projector and a PC in the first embodiment.

Functional blocks of the projector 100 and the PC 200 having such functions are explained. FIG. 2 is a functional block diagram of the projector 100 and the PC 200 in the first embodiment.

The projector 100 includes the imaging unit 130 that generates a pickup image, a positional-information generating unit 140 that generates positional information on the basis of the pickup image, a projection-side interface unit 110 that transmits the positional information and receives image information, an image generating unit 120 that generates an image on the basis of the image information and the like, an operation unit 150, and a projecting unit 190 that projects an image.

The PC 200 includes a supply-side interface unit 210 that receives the positional information and transmits the image information, an image-information generating unit 220 that generates the image information, and a display unit 290 that displays an image on the basis of the image information.

Figure 3A:
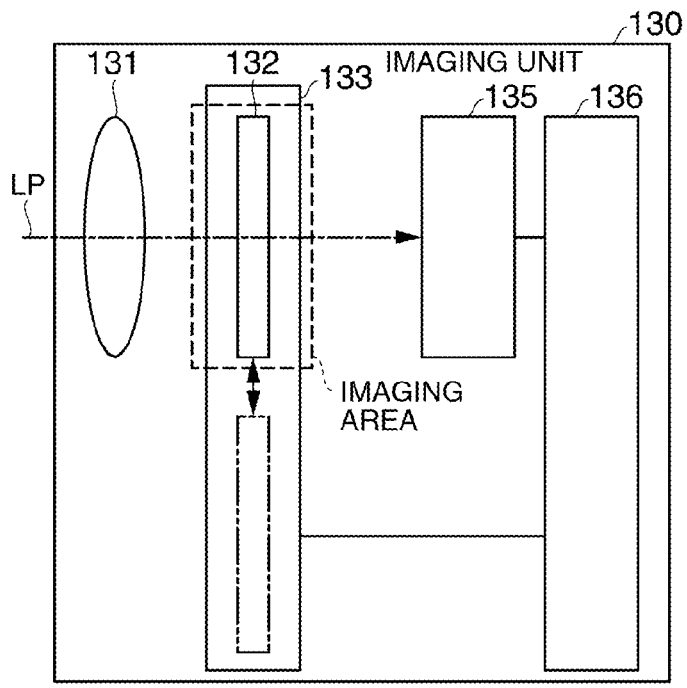
FIG. 3A is a diagram of an example of the configuration of an imaging unit in the first embodiment.
Figure 3B:
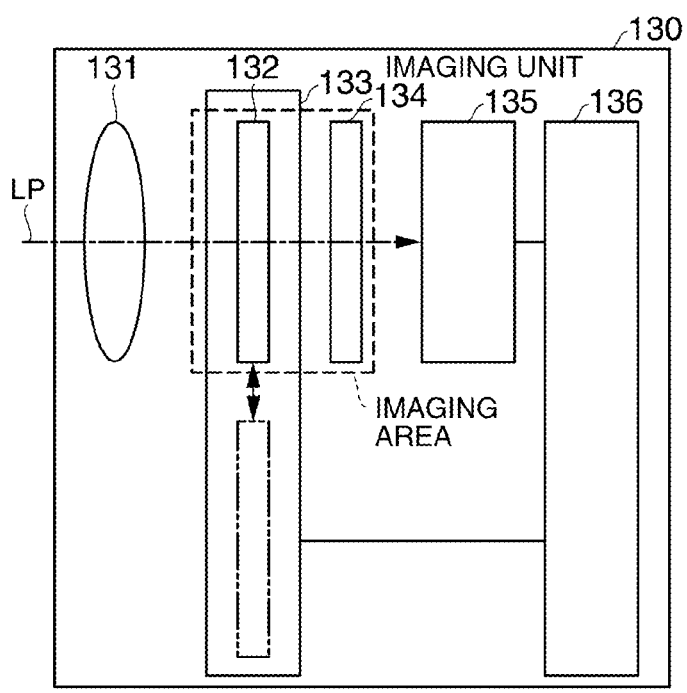
FIG. 3B is a diagram of another example of the configuration of the imaging unit in the first embodiment.

The configuration of the imaging unit 130 is explained more in detail. FIG. 3A is a diagram of an example of the configuration of the imaging unit in the first embodiment. FIG. 3B is a diagram of another example of the configuration of the imaging unit in the first embodiment.

Figure 4:
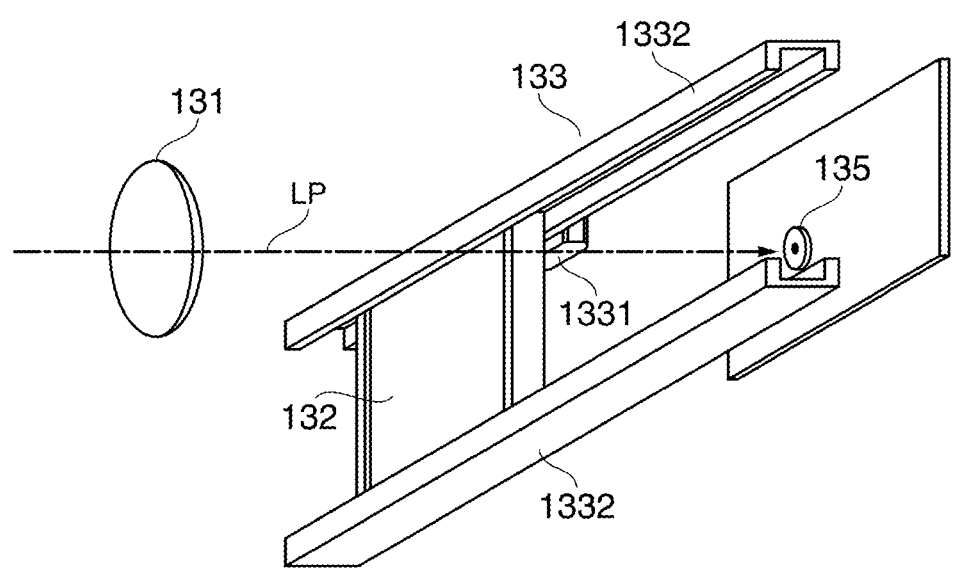
FIG. 4 is a diagram of the imaging unit in the first embodiment.

The imaging unit 130 includes an imaging lens 131, a first filter 132 in which the transmittance of visible light as the light in the first wavelength band of the invention is lower than the transmittance of invisible light such as infrared light as the light in the second wavelength band of the invention, a second filter 134 in which the transmittance of the invisible light is lower than the transmittance of the visible light, an imaging sensor 135, a driving unit 133 that moves the first filter 132 to the inside and the outside of an imaging area (e.g., a range of light transmitted through the imaging lens 131 around an optical axis LP indicated by an alternate long and short dash line in FIGS. 3A and 3B), and a control unit 136 that controls the driving unit 133. FIG. 4 is a perspective view for explaining the configuration of the driving unit 133. The driving unit 133 corresponds to the filter driving unit of the invention and includes a motor 1331 that generates power for changing the position of the filter 132 and a guide 1332 that regulates the movement of the filter 132. The motor 1331 generates, according to a control signal from the control unit 136, power for driving the filter 132. The power generated by the motor 1331 is transmitted to the filter 132 by using various mechanisms such as a worm gear and a rack and pinion. FIG. 4 indicates that the filter 132 is located in a position where the filter 132 does not prevent the incident of the visible light on the sensor 135. In general, as shown in FIG. 3A, a function of the second filter 134 is incorporated in the imaging sensor 135. It is assumed that, in the first filter 132, the transmittance of invisible light having wavelength equal to or larger than 780 nm is higher than the transmittance of visible light having wavelength smaller than 780 nm and, in the second filter 134, the transmittance of the invisible light having wavelength equal to or larger than 780 nm is lower than the transmittance of the visible light having wavelength smaller than 780 nm. The visible light having wavelength smaller than 780 nm is included in the first band. The infrared light having wavelength equal to or larger than 780 nm is included in the second band. The wavelength of 780 nm corresponds to an upper limit of wavelength of light that can be recognized by the human visual sense.

The projector 100 and the PC 200 may function as these units using hardware explained below. For example, in the projector 100 and the PC 200, USB interfaces and the like may be used as the projection-side interface unit 110 and the supply-side interface unit 210. CPUs and the like may be used as the positional-information generating unit 140 and the image-information generating unit 220. An image processing circuit and the like may be used as the image generating unit 120. An imaging lens, a filter, a motor for driving the filter, a CCD sensor, a CPU, and the like may be used as the imaging unit 130. Operation buttons and the like may be used as the operation unit 150. A lamp, a liquid crystal panel, a liquid crystal driving circuit, a projection lens, and the like may be used as the projecting unit 190. A liquid crystal display and the like may be used as the display unit 290.

Figure 5:
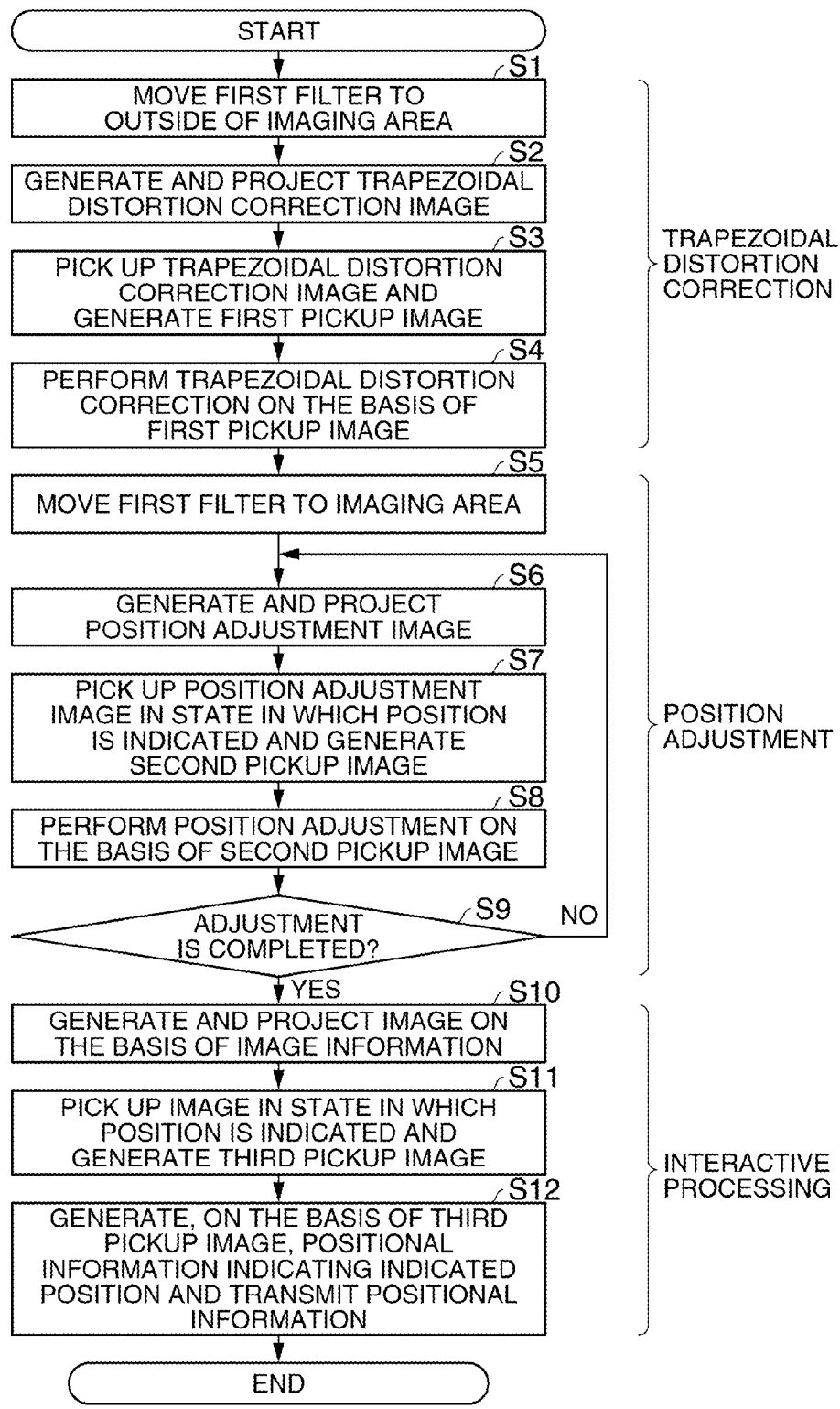
FIG. 5 is a flowchart for explaining an image projecting procedure in the first embodiment.

A procedure for projecting an image using these units is explained below. FIG. 5 is a flowchart for explaining an image projecting procedure in the first embodiment.

The projector 100 performs calibration by performing keystone distortion correction and position adjustment for indication light and executes interactive processing for projecting an image corresponding to the position of the indication light after the calibration.

A user operates an operation panel included in the operation unit 150 or a not-shown remote controller to start setup of the projector 100 for performing the keystone distortion correction and the position adjustment for the indication light.

When the keystone distortion correction is performed, the control unit 136 controls the driving unit 133 to move the first filter 132 to the outside of the imaging area to make it easy to detect visible light (step S1). Consequently, the imaging unit 130 can pick up an image of the screen 10 in a visible light band. The image generating unit 120 generates a keystone distortion correction image on the basis of a computer program or image data stored therein. The projecting unit 190 projects the keystone distortion correction image (step S2). The imaging unit 130 picks up an image of the imaging range 30 including the keystone distortion correction image projected on the screen 10 and generates a first pickup image (step S3). The image generating unit 120 performs the keystone distortion correction on the basis of the first pickup image (step S4).

Figure 6:
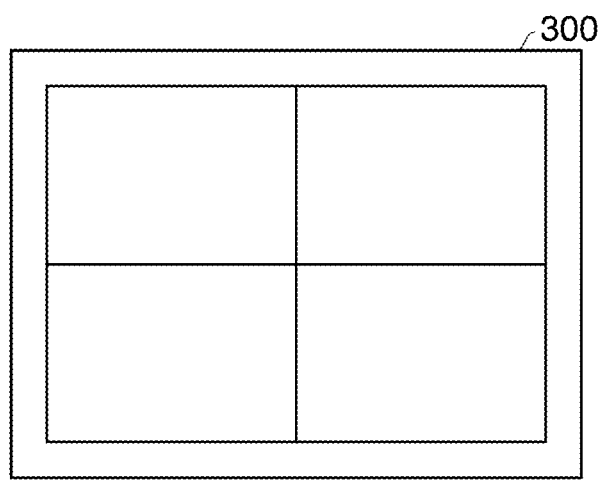
FIG. 6 is a diagram of an example of a keystone distortion correction image in the first embodiment.

FIG. 6 is a diagram of an example of a keystone distortion correction image 300 in the first embodiment. The keystone distortion correction image 300 includes a pattern image in which rectangles are continuously arranged in two rows and two columns. As shown in FIG. 6, the keystone distortion correction image 300 has nine reference points in total as end points or intersections of lines in the pattern image. When the screen 10 and the projector 100 are not right opposed to each other, the keystone distortion correction image 300 is projected in a state distorted in a keystone shape like the image 20 shown in FIG. 1A.

The positional-information generating unit 140 generates, on the basis of the first pickup image, positional information indicating positions (e.g., XY coordinate values) of reference points in an imaging area of the imaging sensor 135. The image generating unit 120 performs the keystone distortion correction by grasping a state of distortion of an image on the basis of the positional information and determining coordinates of vertexes of a correction target area in which an image should be generated after the keystone distortion correction in an image forming area of a liquid crystal panel. The image generating unit 120 generates an image in the correction target area, whereby an image without distortion is projected on the screen 10. When there is no distortion of the image or when there is little distortion of the image, the projector 100 does not have to perform the keystone distortion correction.

The projector 100 performs position adjustment after the keystone distortion correction in order to accurately detect a position indicated by the electronic pen 40. When the position adjustment is performed, in order to make it easy to acquire infrared light emitted by the electronic pen 40, the control unit 136 controls the driving unit 133 to move the first filter 132 into the imaging area (step S5). Consequently, the imaging unit 130 can pick up an image of the screen 10 in an invisible light band. It is assumed that, when the first filter 132 and the second filter 134 overlap, the transmittance of the invisible light is higher than the transmittance of the visible light.

The image generating unit 120 generates a position adjustment image on the basis of image information from the PC 200. The projecting unit 190 projects the position adjustment image (step S6).

Figure 7:
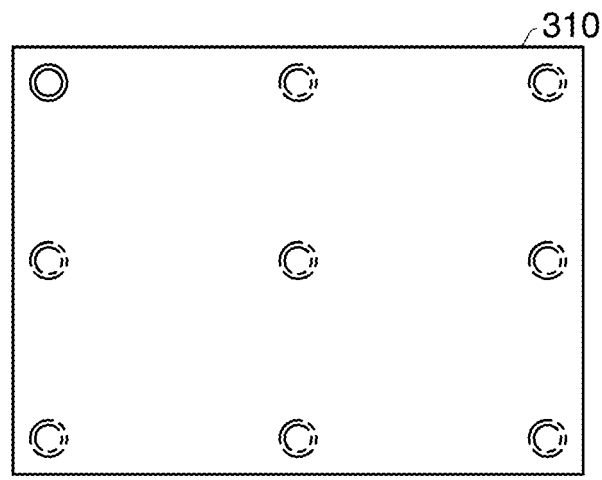
FIG. 7 is a diagram of an example of a position adjustment image in the first embodiment.
Figure 8:
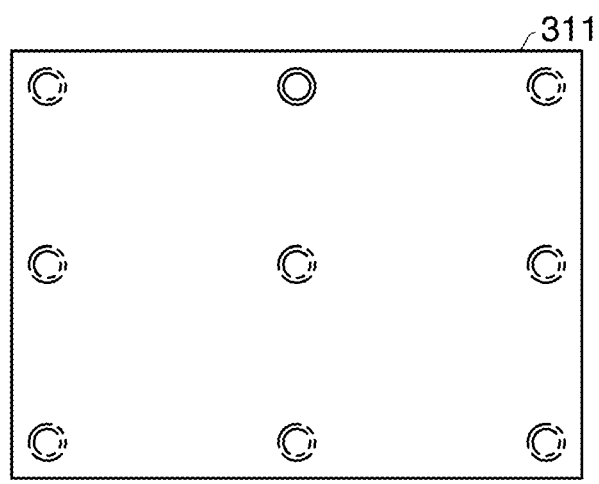
FIG. 8 is a diagram of another example of the position adjustment image in the first embodiment.

FIG. 7 is a diagram of an example of a position adjustment image 310 in the first embodiment. FIG. 8 is a diagram of another example of a position adjustment image 311 in the first embodiment. Each of the position adjustment images 310 and 311 has nine measurement points in total (3 horizontal×3 vertical).

Actually, in order to make it easy for the user to indicate measurement points, the image generating unit 120 generates a position adjustment image in which measurement points are indicated one by one from a measurement point at the upper left to a measurement point at the lower right. For example, in the position adjustment image 310, only the measurement point at the upper left is displayed. In the position adjustment image 311, only the measurement point in the upper center is displayed.

The user indicates, using the electronic pen 40, measurement points of the position adjustment images 310 and 311 projected on the screen 10. For example, the user presses the electronic pen 40 against the screen 10, whereby infrared light is emitted from the tip of the electronic pen 40. The imaging unit 130 picks up the imaging range 30 including the position adjustment images 310 and 311, positions of which are indicated, and generates a second pickup image (step S7).

The PC 200 performs, on the basis of the second pickup image, adjustment of the position indicated by the electronic pen 40 (step S8). More specifically, for example, the positional-information generating unit 140 generates, on the basis of the second pickup image, positional information indicating the position of the infrared light in the imaging area of the imaging sensor 135. The projection-side interface unit 110 transmits the positional information to the PC 200.

The supply-side interface unit 210 receives the positional information. The image-information generating unit 220 compares the position of a measurement point indicated by the positional information and the position of the measurement point measured in a standard environment and generates position adjustment data according to a difference between both the positions.

The projector 100 determines whether the position adjustment for the nine measurement points ends (step S9). When the position adjustment for the nine measurement points ends, the position adjustment ends. The PC 200 can grasp a difference between the standard environment and an actual projection environment on the basis of the position adjustment data.

When the keystone distortion correction and the position adjustment end, the calibration ends. After the calibration ends, the image-information generating unit 220 generates image information for presentation. The supply-side interface unit 210 transmits the image information to the projector 100.

The projection-side interface unit 110 receives the image information. The image generating unit 120 generates an image on the basis of the image information. The projecting unit 190 projects the image on the screen 10 (step S10).

The user indicates a desired position using the electronic pen 40 in a state in which the image is projected on the screen 10. For example, when the image is an image showing a question and choices of answers to the question, the user presses a part of an answer with the electronic pen 40 to thereby emit infrared light.

The imaging unit 130 picks up an image in a state in which the position is indicated and generates a third pickup image (step S11). The positional-information generating unit 140 generates, on the basis of the third pickup image, positional information indicating an indicated position in the imaging area. The projection-side interface unit 110 transmits the positional information to the PC 200 (step S12).

The supply-side interface unit 210 receives the positional information. The image-information generating unit 220 determines an actual indicated position on the basis of the positional information and the position adjustment data and generates image information indicating an image corresponding to the indicated position. For example, the image-information generating unit 220 generates, when an answer indicated by the user is the correct answer, image information of an image showing the answer and indicating that the answer is the correct answer. The supply-side interface unit 210 transmits the image information to the projector 100.

The projection-side interface unit 110 receives the image information. The image generating unit 120 generates, on the basis of the image information, an image showing the answer and indicating that the answer is the correct answer. The projecting unit 190 projects the image (step S10).

In this way, in the interactive processing, the projector 100 repeatedly executes the processing in steps S10 to S12.

As explained above, according to this embodiment, the projector 100 can perform the keystone distortion correction using one imaging unit 130 and project an image based on positional information of indication light in a state in which the keystone distortion correction is performed. Therefore, the projector 100 can effectively utilize the imaging function.

According to this embodiment, the projector 100 can realize, using one imaging unit 130, an automatic keystone distortion correcting function and an interactive processing function performed by using the electronic pen 40.

According to this embodiment, the projector 100 can more accurately perform the position adjustment and the keystone distortion correction by projecting the keystone distortion correction image 300 and the position adjustment images 310 and 311.

According to this embodiment, the projector 100 can project an image corresponding to the position of indication light by, for example, projecting an image based on image information indicating an image corresponding to positional information from the PC 200.

Second Embodiment

In the first embodiment, the projector 100 projects the keystone distortion correction image 300 and the position adjustment images 310 and 311. However, the projector 100 may project a calibration image that makes it possible to execute both of the keystone distortion correction and the position adjustment. In the first embodiment, the PC 200 grasps a difference between indicated positions in an actual environment and the standard environment and determines an actual indicated position. However, a projector may grasp a difference between indicated positions in an actual environment and the standard environment and determine an actual indicated position.

Figure 9:
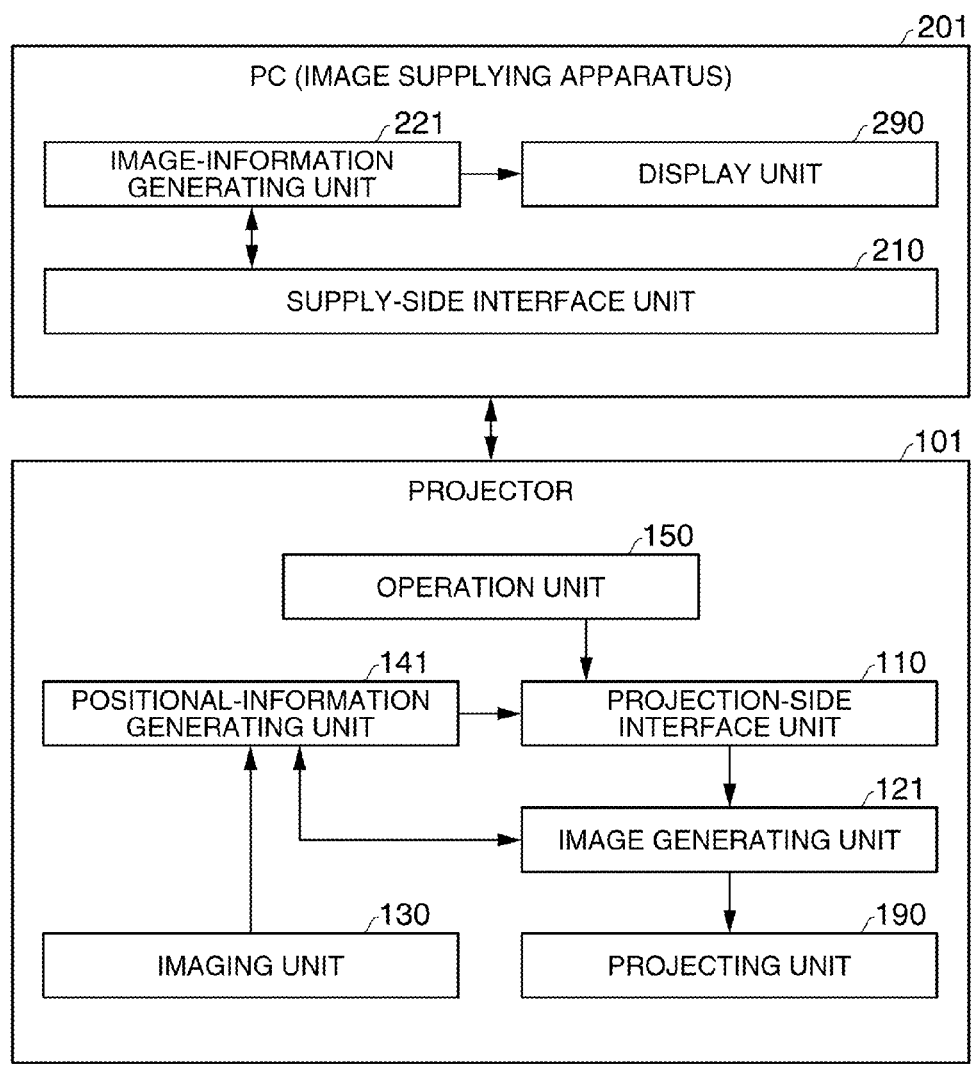
FIG. 9 is a functional block diagram of a projector and a PC in a second embodiment.

FIG. 9 is a functional block diagram of a projector 101 and a PC 201 in a second embodiment. The projector 101 includes the imaging unit 130, a positional-information generating unit 141, the projection-side interface unit 110, an image generating unit 121, the operation unit 150, and the projecting unit 190 that projects an image. The projector 101 is different from the projector 100 in that the image generating unit 121 transmits state information indicating a correction state of keystone distortion correction to the positional-information generating unit 141 and the positional-information generating unit 141 generates positional information according to the state information.

The PC 201 includes the supply-side interface unit 210, an image-information generating unit 221, and the display unit 290 that displays an image on the basis of image information. The PC 201 is different from the PC 200 in that the image-information generating unit 221 has a function of grasping a difference between indicated positions in an actual environment and a standard environment and determining an actual indicated position.

Figure 10:
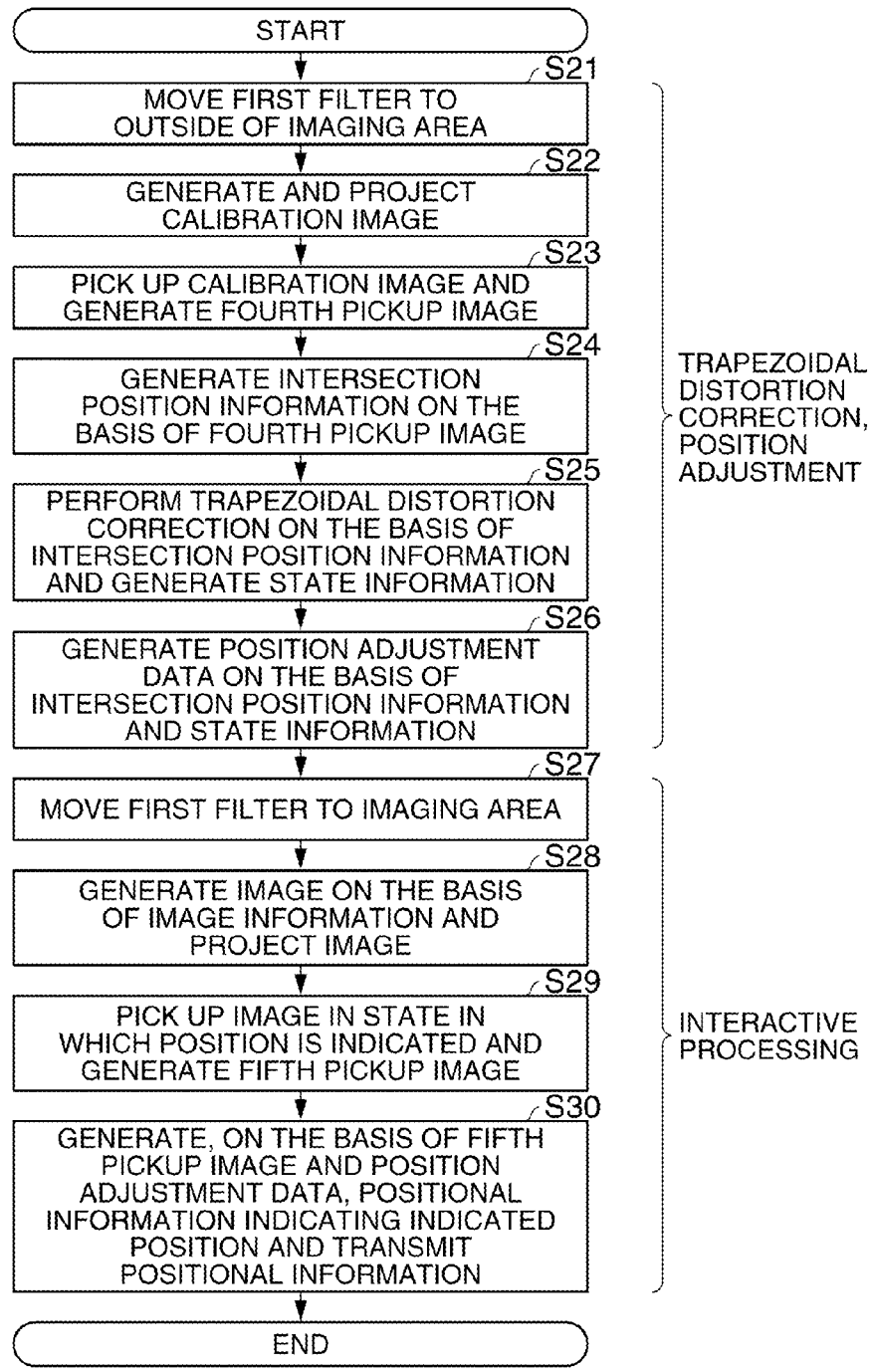
FIG. 10 is a flowchart for explaining an image projecting procedure in the second embodiment.

A procedure for projecting an image using these units is explained below. FIG. 10 is a flowchart for explaining an image projecting procedure in the second embodiment.

As in the first embodiment, the projector 101 performs calibration by performing keystone distortion correction and position adjustment for indication light according to the setup start instruction with the operation unit 150 or the like by the user and executes interactive processing for projecting an image corresponding to the position of the indication light after the calibration.

The control unit 136 controls the driving unit 133 to move the first filter 132 to the outside of an imaging area (step S21). The image generating unit 121 generates a calibration image on the basis of a computer program or image data stored therein. The projecting unit 190 projects the calibration image (step S22).

Figure 11:
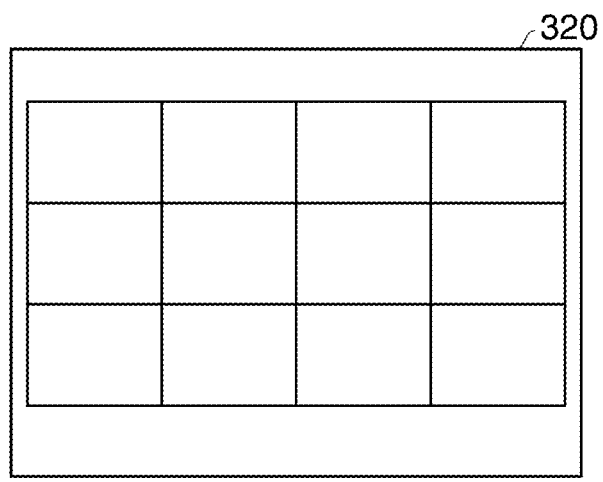
FIG. 11 is a diagram of an example of a calibration image in the second embodiment.

FIG. 11 is a diagram of an example of a calibration image 320 in the second embodiment. The calibration image 320 includes a pattern image in which rectangles are continuously arranged in three rows and four columns. As shown in FIG. 11, the calibration image 320 has twenty reference points in total as end points or intersections of lines in the pattern image.

The imaging unit 130 picks up an image of the imaging range 30 including the calibration image 320 projected on the screen 10 and generates a fourth pickup image (step S23). The positional-information generating unit 141 generates, on the basis of the fourth pickup image, positional information (intersection position information) indicating the positions in the imaging area of the reference points (step S24).

The image generating unit 121 performs the keystone distortion correction by grasping a state of distortion of an image on the basis of the intersection position information and determining coordinates of vertexes of a correction target area in which an image should be generated after the keystone distortion correction in an image forming area of a liquid crystal panel. The image generating unit 121 generates state information indicating the state of the distortion of the image (step S25).

The positional-information generating unit 141 generates image adjustment data for performing adjustment of an indicated position by determining, on the basis of the intersection position information and the state information, correction amounts of the reference points in a state in which the keystone distortion correction is performed (step S26).

When the keystone distortion correction and the position adjustment end, the calibration ends. After the calibration ends, in order to make it easy for the projector 101 to acquire infrared light emitted by the electronic pen 40, the control unit 136 controls the driving unit 133 to move the first filter 132 into the imaging area (step S27).

The image-information generating unit 221 generates image information for presentation. The supply-side interface unit 210 transmits the image information to the projector 101. The projection-side interface unit 110 receives the image information. The image generating unit 121 generates an image on the basis of the image information. The projecting unit 190 projects the image on the screen 10 (step S28).

A user indicates a desired position using the electronic pen 40 in a state in which the image is projected on the screen 10. The imaging unit 130 picks up an image in a state in which the position is indicated and generates a fifth pickup image (step S29). The positional-information generating unit 141 generates, on the basis of the fifth pickup image and the state information, positional information indicating an indicated position in a state in which the keystone distortion correction is performed and generates, on the basis of the positional information and position adjustment data, positional information indicating an indicated position in the imaging area of the imaging unit 130 in the state in which the keystone distortion correction is performed. The projection-side interface unit 110 transmits the positional information to the PC 201 (step S30).

The supply-side interface unit 210 receives the positional information. The image-information generating unit 221 determines, on the basis of the positional information, an actual indicated position in an image and generates image information indicating an image corresponding to the indicated position. The supply-side interface unit 210 transmits the image information to the projector 101.

The projection-side interface unit 110 receives the image information. The image generating unit 121 generates an image on the basis of the image information. The projecting unit 190 projects the image (step S28).

In this way, in the interactive processing, the projector 101 repeatedly executes the processing in steps S28 to S30.

As explained above, according to this embodiment, the projector 101 realizes actions and effects same as those in the first embodiment. According to this embodiment, the projector 101 can more accurately project an image corresponding to the position of indication light by generating positional information corresponding to a correction state of keystone distortion correction.

Further, according to this embodiment, the projector 101 can reduce calibration time and perform adjustment of an indication position without using the electronic pen 40 by using the calibration image 320 for performing both of the keystone distortion correction and the indication position adjustment.

Other Embodiments

The application of the invention is not limited to the embodiments explained above. Various modifications of the embodiments are possible. For example, the positional-information generating units 140 and 141 may transmit not only positional information but also light emission state information indicating a light emission pattern of the electronic pen 40 to the PCs 200 and 201.

Consequently, the projectors 100 and 101 can transmit a light emission pattern corresponding to operation such as click and drag to the PCs 200 and 201. Therefore, the PCs 200 and 201 can generate image information corresponding to complicated operation.

The indication light is not limited to infrared light and may be, for example, ultraviolet light. As a method of moving the first filter 132, various methods such as translation and rotation can be adopted.

The driving unit 133 may move the second filter 134 instead of the first filter 132 or may move both the first and second filters 132 and 134. For example, in a state in which the first filter 132 is provided in the imaging area, the driving unit 133 may move the second filter 134 to the imaging area during generation of a first pickup image and move the second filter 134 to the outside of the imaging area during generation of a second pickup image. In this case, it is assumed that the transmittance of visible light is higher than the transmittance of invisible light in a state in which the first and second filters 132 and 134 overlap.

The image used in the interactive processing is not limited to the image of a question and the image of an answer. Various images used in the interactive processing such as an image for drawing a moving locus of the electronic pen 40 and an image for, for example, drawing an underline according to the operation of the electronic pen 40 can be adopted.

The positional information generated by the positional-information generating unit 140 is not limited to the information indicating coordinates in the imaging area of the imaging unit 130 and may be, for example, information indicating coordinates in the image forming area of the liquid crystal panel.

The projector 100 is not limited to a liquid crystal projector (a transmission type and a reflection type such as LCOS) and may be, for example, a projector including a digital micromirror device. The functions of the projector 100 may be distributed to plural apparatuses (e.g., a PC and a projector or a camera and the projector).

The image supplying apparatus is not limited to the PC 200 and may be, for example, a cellular phone, a game apparatus, a HDD recorder, and a DVD player.

What is claimed is:

1. A projector comprising:
an imaging unit that picks up an image of a projection target area with light in a first wavelength band and generates a first pickup image and picks up an image of the projection target area with light in a second wavelength band and generates a second pickup image;
a positional-information generating unit that generates, on a basis of the first pickup image, adjustment data for performing adjustment of positional information indicating a position of indication light and generates, on a basis of the second pickup image, the positional information; and
a projecting unit that projects an image based on the positional information.

2. The projector according to claim 1, wherein the imaging unit includes:

a first filter in which transmittance of the light in the first wavelength band is sufficiently lower than transmittance of the light in the second wavelength band;

an imaging sensor; and a filter driving unit that moves, during the generation of the second pickup image, the first filter such that the light in the first wavelength band is not made incident on the imaging sensor.

3. The projector according to claim 1, wherein the imaging unit includes:

a second filter in which transmittance of the light in the second wavelength band is sufficiently lower than transmittance of the light in the first wavelength band;

an imaging sensor; and a filter driving unit that moves, during the generation of the first pickup image, the second filter such that the light in the second wavelength band is not made incident on the imaging sensor.

4. The projector according to claim 1, wherein the projecting unit projects a position adjustment image for performing position adjustment for the indication light on the projection target area, and the imaging unit picks up an image of the projection target area including the indication light to thereby generate the second pickup image in a state in which the position adjustment image is projected.

5. The projector according to claim 1, wherein the light in the second wavelength band is light in an infrared region.

6. The projector according to claim 2, wherein the imaging unit further includes a guide substantially orthogonal to a direction in which light is made incident on the imaging sensor, and the filter driving unit drives the first filter to move along the guide.

7. The projector according to claim 3, wherein the imaging unit further includes a guide substantially orthogonal to a direction in which light is made incident on the imaging sensor, and the filter driving unit drives the second filter to move along the guide.

8. The projector according to claim 1, further comprising a projection-side interface unit that transmits the positional information to an image supplying apparatus and receives image information indicating an image corresponding to the positional information from the image supplying apparatus.

9. An image projecting system comprising:

the projector according to claim 8; and the image supplying apparatus, wherein the image supplying apparatus includes:

a supply-side interface unit that transmits the image information to the projector and receives the positional information from the projector, and an image-information generating unit that generates the image information on the basis of the positional information.

10. An image projecting method for a projector including an imaging unit, comprising:

picking up an image of a projection target area with light in a first wavelength band and generating a first pickup image by the imaging unit;

picking up an image of the projection target area with light in a second wavelength band and generating a second pickup image by the imaging unit;

generating, on a basis of the first pickup image, adjustment data for performing adjustment of positional information indicating a position of indication light;

generating, on a basis of the second pickup image, the positional information; and projecting an image based on the positional information.

11. The image projecting method according to claim 10, further comprising picking up, during the generation of the second pickup image, an image of the projection target area via a first filter in which transmittance of the light in the first wavelength band is sufficiently lower than transmittance of the light in the second wavelength band and generating the second pickup image.

12. The image projecting method according to claim 10, further comprising picking up, during the generation of the first pickup image, an image of the projection target area via a second filter in which transmittance of the light in the second wavelength band is sufficiently lower than transmittance of the light in the first wavelength band and generating the first pickup image.

13. The image projecting method according to claim 10, further comprising:

projecting a position adjustment image for performing position adjustment for the indication light on the projection target area; and picking up an image of the projection target area including the indication light to thereby generate the second pickup image in a state in which the position adjustment image is projected.

\* \* \* \* \*